May 19, 1936.  R. H. PEPPER  2,041,648
COMBINATION RECLINING MOVABLE AUTO SEAT AND BED
Filed Jan. 15, 1934  2 Sheets-Sheet 1

INVENTOR
Robert H Pepper

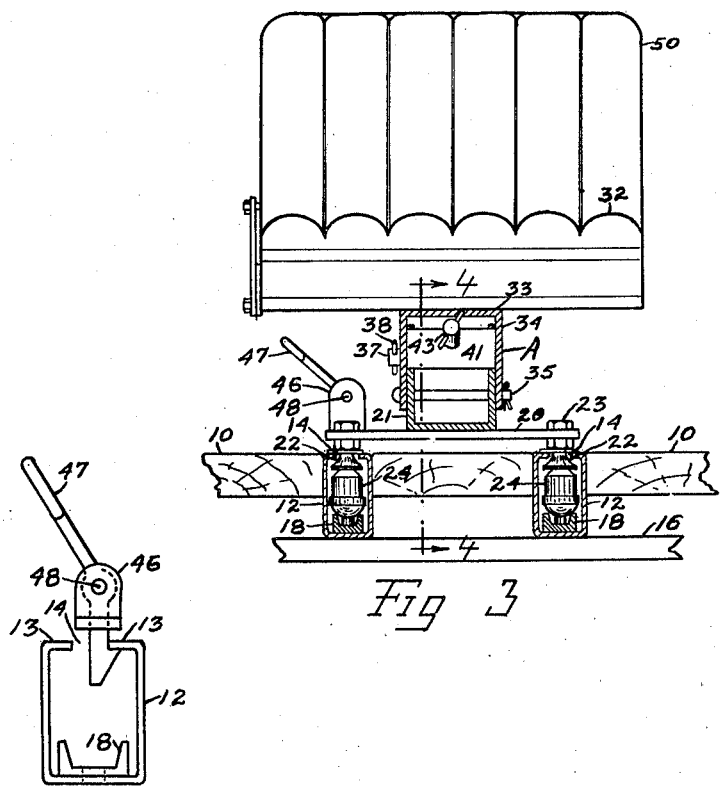

Patented May 19, 1936

2,041,648

UNITED STATES PATENT OFFICE 2,041,648

COMBINATION RECLINING MOVABLE AUTO SEAT AND BED

Robert H. Pepper, Miami, Fla., assignor of two-fifths to Ralph M. Costello, Miami, Fla.

Application January 15, 1934, Serial No. 706,624

6 Claims. (Cl. 155—14)

This invention relates to vehicles, and more particularly it pertains to a new and novel seating arrangement especially adaptable to motor vehicles.

A feature of the invention resides in the provision of a novel construction whereby a motor vehicle seat may be adjusted to accommodate an occupant and so position him that possibility of an occupant's being dislodged completely from the seat is prevented.

A further feature of the invention resides in the provision of a novel construction whereby an automobile seat may be readily moved forwardly and backwardly of a vehicle body, thus making the seat especially adaptable for use in connection with bodies of the so called two door type wherein a forward seat must be moved to give ready access to the rear compartment and seat.

Further, the invention resides in a novel construction which permits of adjustment of the front seat with relation to the controls of the vehicle.

Still a further feature of the invention resides in the provision of an automatic means for locking the seat in any of its adjusted positions merely by the tilting of the seat upon its supporting means.

Still a further feature of the invention resides in a novel construction whereby the seat itself may be locked in a predetermined adjusted position, or may be left free for resilient or cushioned pivotal movement.

Certain other features of the invention relate to novel means whereby the seat together with its back, may be so adjusted with relation to an adjacent seat of a vehicle, that in combination therewith, it may be employed as a bed and permit an occupant to assume a full reclining position.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in its preferred form and the following detailed description of the constructions therein shown.

In the drawings:

Figure 3 is a view partly in elevation and partly in section taken along the line 3—3 of Figure 1.

Figure 4 is an enlarged sectional view taken on the line 4—4 of Figure 3, and;

Figure 5 is a detail view partly in elevation and partly in section taken on the line 5—5 of Figure 4.

Figure 1:
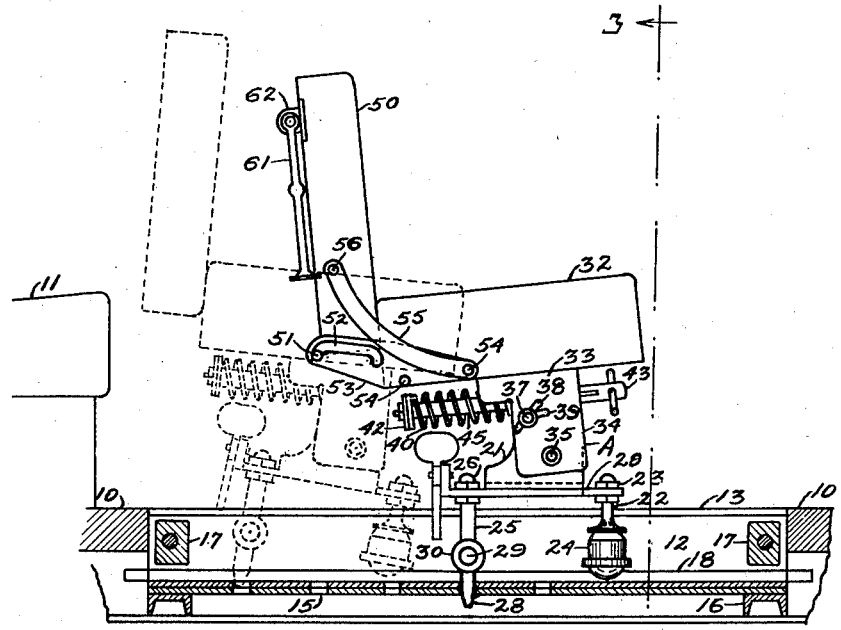
Figure 1 is a view partly in elevation and partly in longitudinal section of a motor vehicle illustrating a seat constructed in accordance with the present invention, the seat being shown in full lines in its upright position, the dotted lines illustrating the manner of adjusting the seat.

Referring more in detail to the drawings, the reference numeral 10 designates the floor of a vehicle and 11 designates the front portion of the rear seat thereof, the complete seat not being shown.

Extending longitudinally of the vehicle and located a point in advance of the rear seat, there is a trackway which consists of two track elements 12. As best illustrated in Figure 5 of the drawings, these track elements 12 are tubular and are so formed as to provide two flat walls 13 on the upper face thereof. These flat walls 13 are spaced from each other by a longitudinally extending slot 14 which preferably extends throughout the length of the track elements. The bottom wall of each track element is provided with a plurality of spaced openings 15 the purpose of which will be hereinafter described.

Figure 2:
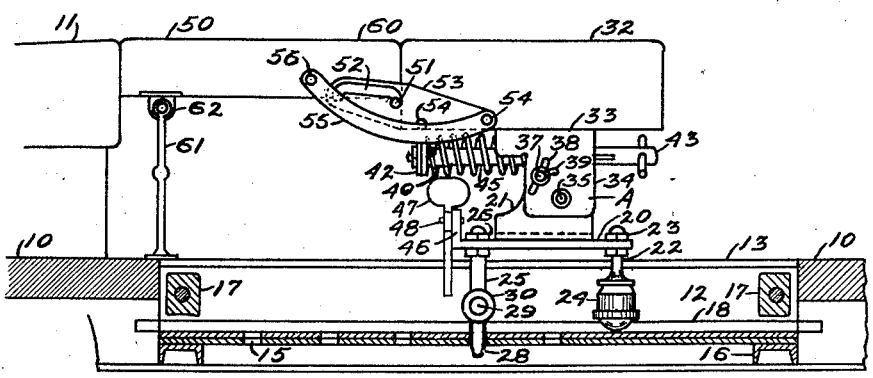
Figure 2 is a similar view showing the seat back folded down and forming in combination with the front and rear seat of the vehicle, a bed.

These track elements are preferably so mounted in the vehicle that their upper face is flush with the floor 10 thereof and as best illustrated in Figures 2 and 3, they may be supported by means of transversely extending braces or the like 16 which are connected at their ends in any suitable manner to the side frames of the vehicle chassis. Shock absorbers in the form of buffers 17 may be provided at the ends of each track element and these buffers are preferably in the form of rubber blocks.

The reference character A designates a carriage and said carriage is adapted for movement along the track way and the construction by which this is accomplished will now be described.

The carriage consists of a platform member 20 and this platform member 20 is provided with upstanding spaced side members 21. The platform 20 is of sufficient length to bridge the trackway as best illustrated in Figure 3 and at each of its front corners, there is carried a ball bearing caster 24. These casters 24 and their shanks 22 are of such dimension that they will roll along the inside face of channel 18 located on the bottom wall of their respective track element, and support the forward edge of the platform 20. Suitable fastening means such as nuts 23 are employed to secure the casters to the platform 20. Secured to each of the rear corners of the platform 20, there is a locking pin 25 and this locking pin is preferably rigidly secured in place by means of nuts or the like 26. A washer 27 may be interposed between each lower nut 26 and the top of each trackway. These locking pins each have a tapered lower end 28 which is adapted to be received in the openings 15 in the bottom wall and/or channel of track element in which it travels in order to lock the carriage against movement longitudinally on the trackway. The locking pins 25 each have laterally projecting stub shafts 29 and mounted on each stub shaft there is a roller 30 which is adapted to engage the upper or inner face of the top walls 13 of the track elements to prevent complete withdrawal of the locking pins from the trackway, but these rollers will be spaced sufficiently from said upper walls to permit of complete disengagement of the lower end of the locking pins from the openings 15.

In order to prevent the locking pins 25 from being accidentally disengaged from spaced openings 15, a latch 47 is provided and is mounted on an ear 46 on platform of carriage 20, by means of bolts and nuts 48. This latch engages under the flat wall of track elements 13, and may be released when it is desired to relocate the carriage.

The seat portion of the front seat is designated 32 and depending from its under face there is a supporting bracket herein shown as an inverted U-shaped member 33 the legs 34 of which occupy overlying relations with respect to the members 21 of the carriage 20 and passing through these legs 34 and the members 21 of the carriage 20 there is a transversely extending bolt 35 which latter forms the means for pivotally mounting the seat member 32 upon the carriage. The members 34 each carry a bolt 37 and each bolt has a wing nut 38. The bolt of each member 21 travels through an arcuate slot 39 in the adjacent member 34 and by tightening the wing nut 38 the seat 32 may be retained in any desired adjusted position and when said wing nut 38 is loosened the seat 32 is free to pivot about the shaft 35.

Means is provided to resist the pivotal movement of the seat about the shaft 35, and this means includes a pair of springs 40.

The springs 40 are interposed between a transversely extending member 41 mounted at the front of the members 21 of the carriage 20 and a transversely extending member 42. The tension of the springs 40 may be regulated by means of a sleeve 43 which is threaded upon a threaded extension 44 of a bolt or the like 45 which occupies a position between the two springs 40 as best illustrated in Figure 4. The spring 40 functions optionally when the clamp nuts 38 on the bolts 37, in slots 39, are not functioning. The seat can be locked against tilting through the medium of the bolts 37 and nuts 38, and by loosening of the nuts 38 the seat portion can be permitted to tilt against the resilient force of the spring, as may be desired.

The back of the seat is designated 50 and at the lower end is provided a pin or similar members 51, which occupies a slot 52 in plates 53 which plates are attached to the rear sides of seat 32 by pins or bolts 54. The forward bolts 54 also act as pivots for links 55. Links 55 are attached to back of seat 50 by pins or bolts 56.

By means of the bolt 51 in the rear end of slot 52 the seat back may be locked in the upright position in which it is shown in Figure 1. When it is desired to lower the seat back to form a bed as illustrated in Figure 2 it is only necessary to raise seat back 50 so as to allow bolt 51 to be released from rear end of slot 52 and to slide through slot 52 as the seat back is lowered. When seat back has been lowered to the longitudinal position shown in Figure 2 the bolt 51 drops into the forward end of slot 52 and supports front end 60 of seat back 50.

The rear of the seat back 50 when in the longitudinal position may be supported by a leg 61 hinged to the seat back as at 62.

In addition to being foldable to position in which the several seats form a bed, the seat is readily adjustable for the purpose of providing comfort for the driver by reason of the fact that the driver may move the seat nearer to or farther from the controls as he may desire. The carriage and the seat structure can be moved forward, as a unit, to give greater space for a person entering or leaving the vehicle.

With the seat in any of its adjusted positions, it is only necessary to rock the seat forward as illustrated in dotted lines in Figure 1 about the casters 24. This action will disengage the locking pins 25 with the openings 15 in the bottom of the track elements and permit the seat to move in either direction. When in the proper position it is dropped and the locking pins will engage with the proper openings 15 to hold the seat in the desired position.

From the foregoing, it will be readily apparent that the present invention provides a new and novel seat for motor vehicles which seat is capable of use in combination with a rear seat to form a bed, which may be readily adjusted relatively to the vehicle controls to suit individual drivers and which may also be easily moved to permit free access to the rear compartment of a vehicle body of the two door type.

In the present embodiment of the invention, it has been illustrated in a preferred form but it is to be understood that the invention is not limited to the specific construction herein shown, and that it may be practiced in other forms without departing from the spirit thereof.

Having thus described the invention, what is claimed as new and what it is desired to secure by Letters Patent of the United States, is:

1. In combination, a pair of spaced tubular trackways each having a slot in its upper wall and a plurality of openings in its lower wall, casters movable along said tubular trackways with their shanks movable through the slot in the upper wall of their respective trackway, a carriage mounted on said casters and bodily tiltable, a seat mounted on said carriage, means mounted on said carriage for engagement with the openings in the bottom wall of said trackways when said carriage is returned from the tilted position to prevent movement of the carriage along the trackways, and manually releasable means carried by the seat and engageable with a trackway to hold the seat against casual tilting.

2. In combination, a pair of spaced tubular trackways each having a slot in its upper wall and a plurality of openings in its lower wall, casters movable through said tubular trackways with their shanks movable along the slot in the upper wall of their respective trackway, a carriage mounted on said casters, and bodily tiltable, a seat mounted on said carriage, and means mounted on said carriage for engagement with the openings in bottom wall of said trackways to prevent movement of carriage along the trackways when said carriage is returned from the tilted position, said last mentioned means comprising pins depending from the carriage, through the slot in the top wall of the trackways, and manually releasable means carried by the seat and engageable with a trackway to hold the seat against casual tilting.

3. In combination, a pair of spaced tubular trackways each having a slot in its upper wall and a plurality of openings in its lower wall, casters movable along said tubular trackways with their shanks movable through the slot in the upper wall of their respective trackway, a carriage mounted on said casters and bodily tiltable, a seat mounted on said carriage, means mounted on said carriage for engagement with the openings in the bottom wall of said trackways to prevent movement of the carriage along the trackways when said carriage is returned from the tilted position, said last mentioned means comprising pins depending from the carriage, through the slots in the top wall of the trackways, and means for preventing movement of the carriage sufficient to completely withdraw the pins from the trackway, and manually releasable means carried by the seat and engageable with a trackway to hold the seat against casual tilting.

4. In combination, a pair of spaced tubular trackways each having a slot in its upper wall and a plurality of openings in its lower wall, casters movable along said tubular trackways with their shanks movable through the slot in the upper wall of their respective trackway, a carriage mounted on said casters to be capable of forward and back adjustment and of bodily tilting movement, a seat mounted on said carriage, and means mounted on said carriage for engagement with the openings in the bottom wall of said trackways when the carriage is returned from a tilted position to prevent movement of said carriage along the trackways, said last mentioned means comprising pins depending from the carriage, through the slots in the top wall of the trackways, and means mounted on and carried by the carriage and engageable with a trackway for preventing tilting movement of the carriage to prevent the accidental disengagement of the locking pins.

5. In combination with a trackway of tubular form and having openings in its bottom wall, a carriage, casters movable along the trackway to support said carriage and about which the carriage may be tilted, means normally engageable in the openings in the bottom wall of the trackway to hold the carriage against movement therealong and movable out of engagement with said openings when the carriage is tilted to permit of adjustment of the carriage, a seat mounted on said carriage, and manually releasable means on the carriage engageable with a trackway to prevent casual tilting of the carriage and consequent disturbance of the adjusted positioning of the carriage.

6. A seat and mount therefor comprising in combination, trackways, a seat and supporting structure adjustably movable along said trackways and bodily tiltable with respect to the trackways, means carried by the seat supporting structure engaging with the trackways for locking said seat in different adjusted positions when the seat is in a position for use and disengaging when the seat is tilted, and manually actuatable means to hold said seat structure in a position for use and to prevent accidental and casual tilting which would consequently disengage the locking means.

ROBERT H. PEPPER.